United States Patent [19]

Brown

[11] Patent Number: 4,771,177
[45] Date of Patent: Sep. 13, 1988

[54] POINT SOURCE FOR TESTING A GAMMA CAMERA

[75] Inventor: Ronald C. Brown, Nashua, N.H.

[73] Assignee: E. I. Du Pont de Nemours and Company, Wilmington, Del.

[21] Appl. No.: 793,785

[22] Filed: Nov. 1, 1985

[51] Int. Cl.$^4$ .............................................. G01T 1/20
[52] U.S. Cl. ............................ 250/363 R; 250/252.1; 378/120; 378/207
[58] Field of Search ..................... 378/120; 250/252.1, 250/363.9 SG

[56] References Cited

U.S. PATENT DOCUMENTS

| | | | |
|---|---|---|---|
| 1,505,209 | 8/1924 | Leach et al. | |
| 2,575,134 | 11/1951 | Schultz et al. | 250/106 |
| 2,820,905 | 1/1958 | Schloss | 250/252.1 |
| 2,849,621 | 8/1958 | Clark | 250/64 |
| 2,944,153 | 7/1960 | Brown | 378/120 |
| 3,064,130 | 11/1962 | DiIanni et al. | |
| 3,161,776 | 12/1964 | Moore | 250/105 |
| 3,334,233 | 8/1967 | Veal | 250/252.1 |
| 3,337,735 | 8/1967 | Christianson et al. | 250/106 |
| 3,600,586 | 8/1971 | Barthelemy et al. | 250/106 |
| 4,033,884 | 7/1977 | Lorch et al. | |
| 4,429,226 | 1/1984 | Inbar | 250/369 |
| 4,517,460 | 5/1985 | Meulenbrugge et al. | 378/207 |
| 4,527,057 | 7/1985 | Guyton et al. | 250/252.1 |

FOREIGN PATENT DOCUMENTS

| | | | |
|---|---|---|---|
| 0860188 | 2/1961 | United Kingdom | 378/152 |
| 1470091 | 4/1977 | United Kingdom | 250/252.1 |

OTHER PUBLICATIONS

"Methods for assay of radioisotopes" by Lyon et al., Nucleonics 8–1966, vol. 24, No. 8.

"Radioisotope Laboratory Techniques" by Faires and Parks, 3d ed. Published 1973 by Butterworths, pp. 194–196.

"Nuclear Radiation Detection" by Price, 2d edition published by McGraw-Hill 1964, pp. 97–99.

Primary Examiner—Craig E. Church
Assistant Examiner—John C. Freeman

[57] ABSTRACT

A point source for calibrating a gamma camera uses the nuclide cerium-141. The source is disposed in a shuttered, shielded housing. The shutter is incrementally advanceable to expose, over time, an increasing portion of the area of the source to maintain a relatively constant gamma ray flux therefrom.

2 Claims, 1 Drawing Sheet

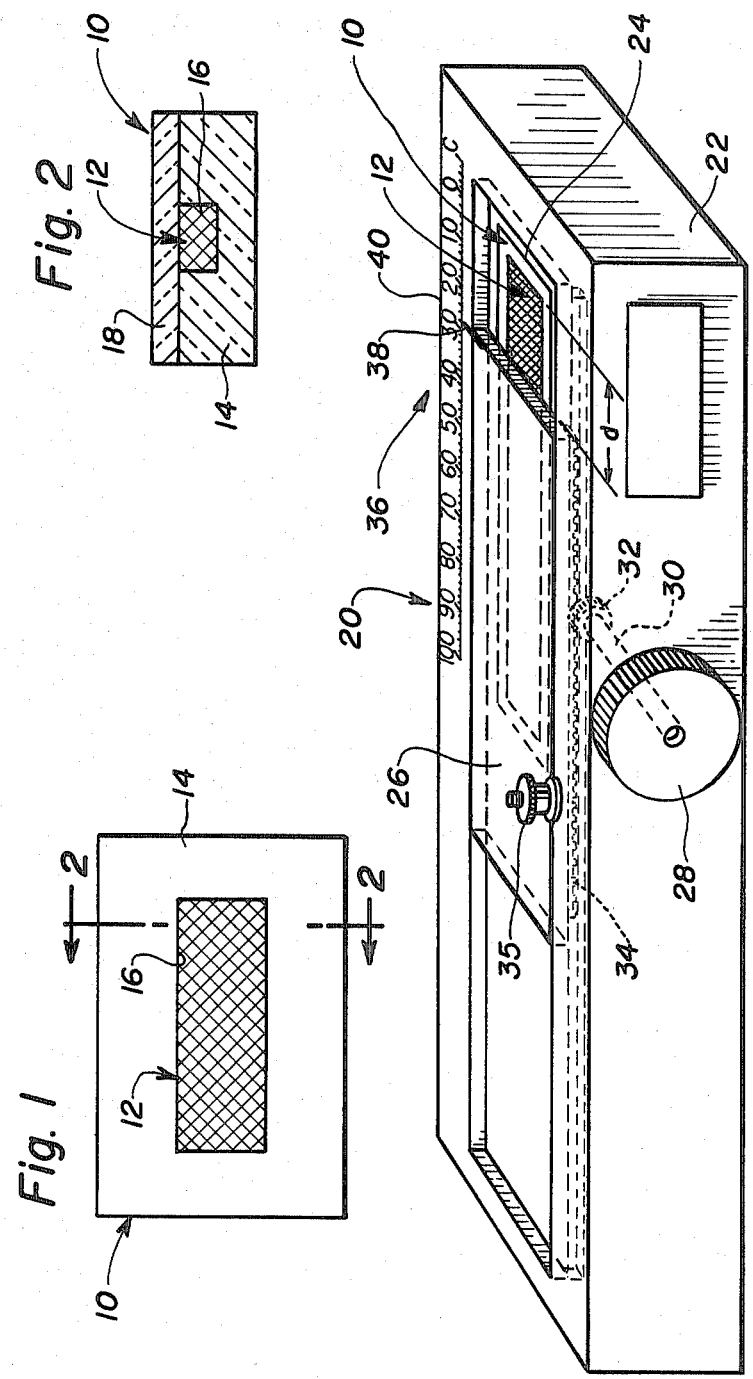

POINT SOURCE FOR TESTING A GAMMA CAMERA

BACKGROUND OF THE INVENTION

1. Field of the Invention

The present invention relates to a point source for testing a gamma camera for field uniformity, spatial resolution and linearity.

2. Description of the Prior Art

A gamma camera is a diagnostic scintigraphic apparatus which is used in medical applications to monitor the progress or distribution of a gamma ray emitting radionuclide that is introduced into a patient. The nuclide of choice is technetium-99M. The gamma camera is positioned in adjacency to that portion of the body of the patient under examination. The camera includes a gamma ray sensitive solid state crystal which provides a response functionally related to the distribution of the nuclide in that portion of the patient's body upon which the camera is trained.

It is essential that the gamma camera undergo careful quality control calibration so that any nonlinearity or nonuniformity in the response of the camera is accommodated in the results of the diagnostic examination using the camera. Preferably the calibrating apparatus utilizes as a gamma ray source either the same nuclide as is used in a patient or a source able to emit gamma rays having similar energy level. The gamma ray emitted from technetium-99M is 140 KeV.

Typical modalities for calibrating gamma cameras include fillable phantom sources, flood sources and point sources. Representative of the structure of a flood source for calibrating gamma cameras is that shown in U.S. Pat. No. 4,033,884 (Lorch et al), U.S. Pat. No. 3,064,130 (Di Ianni et al) and U.S. Pat. No. 4,517,460 (Meulenbrugge et al) both relate to the calibration of gamma instruments.

Technetium-99M is commonly used for a point source modality but due to its six-hour half-life it requires daily preparation. Another material that may be used as a point source is tellurium-123M. However, tellurium-123M has a gamma ray at 159 KeV, which is spaced from that of technetium-99M. Cobalt-57, although used primarily for flood sources, may also be used in a point source, however, its primary gamma ray at 122 KeV is also spaced from that of technetium-99M.

Accordingly, in view of the foregoing, it is believed advantageous to provide a point source for calibrating gamma cameras which utilizes a radioactive material emitting a monoenergetic gamma ray closer to that of technetium-99M than that emitted by cobalt-57 or tellurium-123M. Further, it is believed desirable to provide a point source using a radioactive material that has a sufficiently long half-life to avoid repeated changes of calibrating source. The radioactive material should preferably be contained in a solid sealed member to maximize safety and convenience in use. It is also desirable to provide a packaging arrangement for the point source which will permit incremental exposure of the point source over a prolonged period (on the order of three months) whereby the same predetermined relatively constant gamma flux may be emitted from the source.

SUMMARY OF THE INVENTION

The present invention relates to a calibrating point source that includes an active member formed into a plastic material that has dispersed therein a predetermined quantity of the nuclide cerium-141. The radioactive material of the point source is preferably uniformly dispersed in an epoxy which is introduced and cured in an acrylic base. The base is covered by a cover plate secured thereto. The point source as described is itself received within a calibrating shielded container that includes a housing and a shutter incrementally movable with respect to the housing from a totally closed position to a fully open position. The shutter is preferably slidably movable in predetermined increments such that progressively more of the active area of the source is exposed as the shutter is advanced from the closed to the open position. A calibration indicia is mounted on either the housing and/or the cover in any location to operatively associate the shutter and the housing whereby the magnitude of the incremental movement of the cover away from the closed toward the open position may provide a calibrated indication of the portion of the area of the active member that is exposed. Exposure of greater portions of the source, over time, compensates for the effects of radioactivity decay and insures a relatively constant gamma ray flux over a predetermined time period.

BRIEF DESCRIPTION OF THE DRAWINGS

The invention may be more fully understood from the following detailed description thereof taken in connection with the accompanying drawings which form a part of this application and in which:

FIG. 1 is a plan view of a point source for gamma camera in accordance with the present invention;

FIG. 2 is a sectional view taken along section lines 2—2 of FIG. 1; and

FIG. 3 is a perspective view of an apparatus for calibrating a gamma camera in accordance with the present invention having the point source of FIGS. 1 and 2 disposed therein.

DETAILED DESCRIPTION OF THE INVENTION

Throughout the following detailed description similar reference numerals refer to similar elements in all figures of the drawings.

The point source generally indicated by reference character 10 in accordance with the present invention includes an active member 12. The active member 12 preferably takes the form of a rectanguloid volume of plastic material having a predetermined quantity of the nuclide cerium-141 dispersed therein. Cerium-141 is selected as the radioactive material because it emits a monoenergetic gamma ray at an energy of 145.4 KeV, which is substantially equal to the energy of the particle emitted by technetium-99M.

The active member 12 is prepared from a predetermined volume of a solution containing the nuclide cerium-141 uniformly mixed within a volume of molten epoxy. The slurry-like resulting mixture is poured into a channel 16 formed in a base 14. Of course, the active member 12 may be alternately manufactured and inserted as a solid member into the channel 16. A cover 18 is cemented or otherwise suitably secured to the base 14 to enclose the upper surface of the active member 12. The base 16 and cover 18 are preferably fabricated of a plastic material such as an acrylic resin material although other appropriate materials may be utilized.

The point source 10 may be used in an apparatus for calibrating a gamma camera generally indicated by reference character 20 in accordance with the present invention. The apparatus 20 comprises a shielding housing 22 having a recess 24 configured to receive the point source 10 therein. The housing 22 may take any predetermined external configuration. A shielding shutter 26 overlies the opening of the recess 24 and is slidably disposed with respect to the housing 22 from a totally closed position to a fully open position. In the totally closed position the cover overlies the entirety of the active member 12 while in the open position the entire active member 12 is exposed to view. The shutter 26 is incrementally movable with respect to the housing 22 by any suitable expedient. In the preferred embodiment shown a control knob 28 is mounted on a shaft 30 carrying a pinion 32. The underside of the shutter 26 has a rack 34 engageable with respect to the pinion 32 such that rotation of the opening knob 28 causes interengagement between the pinion 32 and the rack 34 thereby to displace the shutter 26 from the closed to the open position. The housing 22 and the shutter 26 may be made from any suitable radiation shielding material. Preferably the housing 22 and the shutter 26 are lead or tungsten. These materials are selected for ease of manufacture. The housing 22 and the shutter 26 are both sufficiently thick to prevent the passage of gamma radiation therethrough.

The housing 22 and the slidable shutter 26 are operatively associated by an indexing arrangement 36 whereby the position of the shutter 26 with respect to the housing 22 may be accurately located. In the preferred embodiment shown in FIG. 3 the indexing arrangement 36 includes a pointer 38 mounted to the shutter 26 and a scale 40 mounted in a cooperating position on the housing 22. The indicia of the scale 40 are located on the housing 22 so as to provide a visible means of ascertaining that percentage of the surface area of the active member 12 which is exposed as the shutter 26 is slidably moved from the closed to the open position. The shutter 26 may be secured in position by a lock nut 35.

In accordance with the present invention the shutter 26 may be advanced in a calibrated manner with respect to the housing 22 so that, over a predetermined time period, the magnitude of the gamma ray flux emanating from the calibrating apparatus 20 is maintained relatively constant over time.

In use, the calibrating apparatus 20 having a point source 10 therein is positioned in the field of a gamma camera being tested. The shutter 26 is opened to a first position as indicated by the relative position of the pointer 38 and the scale 40. A predetermined gamma ray flux is directed toward the instrument. The instrument is then calibrated. At a predetermined later time the shutter 26 is opened to a second, greater, amount as indicated by the relative position of the pointer 38 and the scale 40. The increased surface area of the active member 12 thus exposed compensates for the radioactive decay of the nuclide in the member 12 so that substantially the same gamma ray flux is produced for the instrument. The calibration is thus, in each instance, calibrated to substantially the same gamma ray flux. In this way, over the useful life of the active member 12 substantially equal flux is produced. When spent, the point source 10 is removed from the housing and replaced.

Any configuration of active member 12 and the shielding shutter 26 may be provided so long as the flux produced remains substantially constant over time. For example, with a point source having an active area that is rectanguloid in volume and has a dimension of 1.0×0.25×0.12 inch (0.48×0.098×0.047 cm), the following table correlates theoretically the portion of the area of the active member 12, expressed in terms of the dimension "d" as measured on the scale 40 as a function of time t whereby a relatively constant flux may be achieved.

| t (days) | d |
|---|---|
| 1 | 0.124 |
| 7 | 0.144 |
| 14 | 0.167 |
| 21 | 0.194 |
| 28 | 0.225 |
| 35 | 0.262 |
| 42 | 0.304 |
| 49 | 0.353 |
| 56 | 0.409 |
| 63 | 0.475 |
| 70 | 0.552 |
| 77 | 0.641 |
| 84 | 0.744 |
| 91 | 0.869 |
| 98 | 1.00 |

It should be understood that as the physical configuration of the active member 12 and the shutter 26 are varied the correlation between exposed area and time may be expressed in terms of another variable. For example, a circular active member covered by a circular shielding shutter could theoretically express the exposed area and time relationship in terms of subtended angle of the segment of the area of the active member that must be exposed to maintain a relatively constant flux over time.

Those skilled in the art having benefit of the present invention as hereinabove set forth may effect numerous modifications thereto. These modifications are, however, to be construed as lying within the scope of the present invention as defined by the appended claims.

What is claimed is:

1. Apparatus for calibrating a gamma camera comprising:
   a housing;
   a point source having an active member mounted in the housing, the point source having a predetermined radioactivity content associated therewith able to produce a predetermined gamma ray flux that decreases over time;
   a shutter incrementally movable with respect to the housing from a first position in which the active member is totally exposed; and
   a calibration indicia operative associating the housing and the shutter and relating the shutter opening to passage of time so that the magnitude of the active member exposed over a predetermined time period is such that a relatively constant gamma ray flux is emitted over that time period.

2. The apparatus of claim 1 wherein the point source comprises an active member having a predetermined quantity of the nuclide cerium-141 dispersed therein.

* * * * *

UNITED STATES PATENT AND TRADEMARK OFFICE
CERTIFICATE OF CORRECTION

PATENT NO. : 4,771,177
DATED : Sept. 13, 1988
INVENTOR(S) : Ronald C. Brown

It is certified that error appears in the above—identified patent and that said Letters Patent is hereby corrected as shown below:

Column 4, line 56, after "totally" insert --shielded to an open position in which the active member is totally--

Column 4, line 57, "operative" should be --operatively--

Signed and Sealed this

Twenty-first Day of March, 1989

Attest:

DONALD J. QUIGG

Attesting Officer

Commissioner of Patents and Trademarks